US012775427B2

(12) United States Patent
Yoshinari et al.

(10) Patent No.: US 12,775,427 B2
(45) Date of Patent: Oct. 27, 2026

(54) QUIET MODE CONTROL FOR IMAGE FORMING APPARATUS

(71) Applicant: FUJIFILM Business Innovation Corp., Tokyo (JP)

(72) Inventors: Kazuya Yoshinari, Kanagawa (JP); Hiroshi Kimura, Kanagawa (JP); Kazuma Hosoda, Kanagawa (JP); Mao Morita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/182,695

(22) Filed: Mar. 13, 2023

(65) Prior Publication Data

US 2024/0103781 A1 Mar. 28, 2024

(30) Foreign Application Priority Data

Sep. 27, 2022 (JP) ................................ 2022-153545

(51) Int. Cl.

*B41J 29/10* (2006.01)
*G06F 3/12* (2006.01)

(52) U.S. Cl.

CPC ........... *G06F 3/1229* (2013.01); *B41J 29/10* (2013.01); *G06F 3/1203* (2013.01)

(58) Field of Classification Search

CPC .... G06F 3/1229; G06F 3/1203; G06F 3/1231; B41J 29/10
USPC ...................... 358/1.15, 1.13; 399/43, 81, 85
See application file for complete search history.

(56) References Cited

U.S. PATENT DOCUMENTS

2017/0201486 A1* 7/2017 Kanazawa .......... H04L 61/5046

FOREIGN PATENT DOCUMENTS

| | | | | |
|---|---|---|---|---|
| JP | 2006289682 | A | * | 10/2006 |
| JP | 2013-258483 | A | | 12/2013 |
| JP | 2017054402 | A | * | 3/2017 |
| JP | 2018-052064 | A | | 4/2018 |

OTHER PUBLICATIONS

Aug. 4, 2026 Office Action issued in Japanese Patent Application No. 2022-153545.

* cited by examiner

*Primary Examiner* — Jamares Q Washington
(74) *Attorney, Agent, or Firm* — Oliff PLC

(57) ABSTRACT

A processing apparatus includes a processor configured to: receive a change request for a change to a quiet mode in an image forming apparatus that is operating in a normal mode and to which a printing instruction has been issued; and display the change request for the change to the quiet mode on an operation screen of the image forming apparatus.

7 Claims, 5 Drawing Sheets

QUIET MODE CONTROL FOR IMAGE FORMING APPARATUS

CROSS-REFERENCE TO RELATED APPLICATIONS

This application is based on and claims priority under 35 USC 119 from Japanese Patent Application No. 2022-153545 filed Sep. 27, 2022.

BACKGROUND

(i) Technical Field

The present disclosure relates to a processing apparatus, a non-transitory computer readable medium, and a processing method.

(ii) Related Art

An image forming system described in Japanese Unexamined Patent Application Publication No. 2018-52064 includes a multi-function printer and multiple mobile terminal apparatuses. If a reception determination unit determines that a request for second mode operation is received, or if a number determination unit determines that the number of mobile terminal apparatuses in a predetermined range is larger than or equal to a predetermined number, a functioning controller performs control to operate an image forming part in a second mode. If the reception determination unit determines that the request for the second mode operation is not received, and if the number determination unit determines that the number of mobile terminal apparatuses in the predetermined range is smaller than the predetermined number, the functioning controller performs control to operate the image forming part in a first mode.

SUMMARY

Image forming apparatuses such as a multi-function printer, a printer, a scanner, and a fax machine produce operating sound in the printing operation. Loud operating sound produced by an image forming apparatus becomes noise. To make the operating sound produced by the image forming apparatus lower, the image forming apparatus is provided with a quiet mode to lower a rotation speed of a motor used to operate the image forming apparatus. Specifically, the image forming apparatus is provided with the quiet mode and a normal mode in which priority is given to printing time.

To date, only a user who executes the issuance of a printing instruction is allowed to select the normal mode or the quiet mode. However, the operating sound in the printing operation influences a user other than the user who issues the printing instruction. For example, a user who works near the image forming apparatus is discomforted by the operating sound on occasions.

Aspects of non-limiting embodiments of the present disclosure relate to a configuration enabling a user other than a user who executes printing instruction issuance to express intention of a change to a quiet mode.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a processing apparatus including a processor configured to: receive a change request for a change to a quiet mode in an image forming apparatus that is operating in a normal mode and to which a printing instruction has been issued; and display the change request for the change to the quiet mode on an operation screen of the image forming apparatus.

BRIEF DESCRIPTION OF THE DRAWINGS

An exemplary embodiment of the present disclosure will be described in detail based on the following figures, wherein.

DETAILED DESCRIPTION

Figure 1:
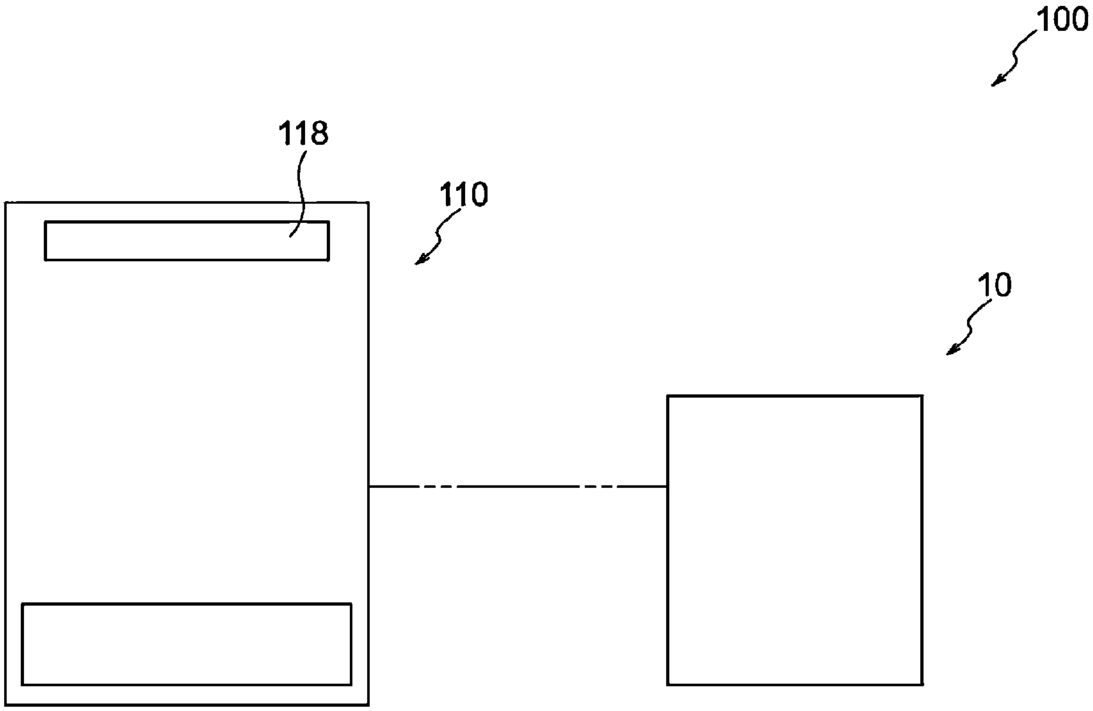
FIG. 1 is a schematic diagram illustrating an image forming system including a processing apparatus according to the exemplary embodiment of the present disclosure.

Examples of a processing apparatus and a processing program according to an exemplary embodiment of the present disclosure will be described with reference to FIGS. 1 to 5. Note that the same or equivalent components and parts are denoted by the same reference numerals throughout the drawings. In addition, the ratios of dimensions in the drawings are exaggerated for convenience of explanation and thus are different from the actual ratios on occasions.

Figure 2:
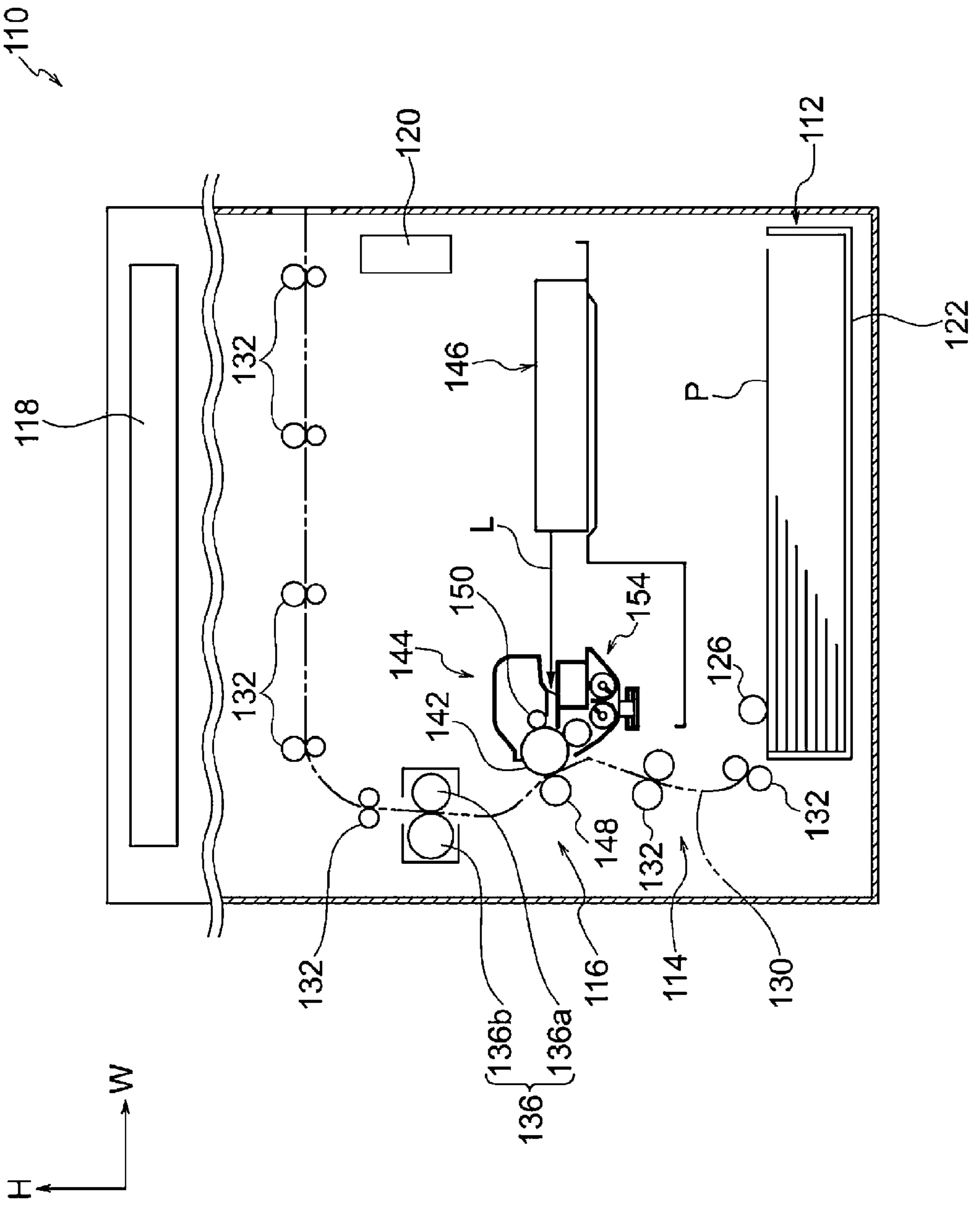
FIG. 2 is a schematic diagram illustrating the image forming apparatus in which a change to a quiet mode is performed by the processing apparatus according to the exemplary embodiment of the present disclosure.

An arrow H illustrated in FIG. 2 points a vertical direction and an upward direction, and an arrow W points a horizontal direction and a width direction. First, a schematic configuration of an image forming system 100 in which a processing apparatus 10 is used will be described. Image Forming System 100

As illustrated in FIG. 1, the image forming system 100 includes an image forming apparatus 110 that forms an image on one of sheet members P each serving as a recording medium in response to receiving a printing instruction from a user (hereinafter, an executing user) who executes the issuance of the printing instruction from their personal computer or the like. The image forming system 100 further includes the processing apparatus 10 that processes a request regarding the printing operation of the image forming apparatus 110 from a user other than the executing user. Note that the printing instruction is what is called a print job, is a processing unit of a printing operation executed in response to an instruction from the executing user, and is image information including attributes such as printing speed and the area coverage (resolution) of an image.

Image Forming Apparatus 110

As illustrated in FIG. 2, the image forming apparatus 110 includes a sheet container part 112 that contains the sheet members P, a transport part 114 that transports each sheet member P, and an image forming part 116 that forms an image on the transported sheet member P. The image forming apparatus 110 further includes an operation screen 118 operated by a user and a controller 120 that controls the components.

Sheet Container Part 112

As illustrated in FIG. 2, the sheet container part 112 includes a container part 122 capable of containing the sheet members P and feed rollers 126 that feed each sheet member P contained in the container part 122 to a transport path 130 for the sheet member P.

In this configuration, the driving force of a driving member 128 (see FIG. 3) operated under the control of the controller 120 is transmitted to rotate the feed rollers 126, and the sheet member P is fed to the transport path 130.

Transport Part 114

As illustrated in FIG. 2, the transport part 114 includes multiple pairs of transport rollers 132 that transport, along the transport path 130, the sheet member P fed from the container part 122 to the transport path 130.

In this configuration, the driving force of a driving member 134 (see FIG. 3) operated under the control of the controller 120 is transmitted to rotate the multiple pairs of transport rollers 132, and the sheet member P is transported along the transport path 130.

Image Forming Part 116

As illustrated in FIG. 2, the image forming part 116 includes an image forming unit 144, an exposure device 146 that radiates exposure light L onto an image holder 142 of the image forming unit 144 to form an electrostatic latent image, and a transfer roller 148 that transfers, onto the sheet member P, a toner image formed by the image forming unit 144. The image forming part 116 further includes a fixing device 136 that fixes, on the sheet member P, the toner image transferred onto the sheet member P.

The image forming unit 144 includes a charger 150 and a developer 154. The charger 150 charges the outer circumferential surface of the rotating image holder 142. The developer 154 develops, into the toner image, the electrostatic latent image formed on the image holder 142 by the exposure device 146. The transfer roller 148 is disposed on the opposite side of the transport path 130 from the image holder 142.

In this configuration, the driving force of a driving member 152 (see FIG. 3) operated under the control of the controller 120 is transmitted to operate the image forming unit 144 and to rotate the transfer roller 148. The transfer roller 148 thereby transfers the toner image on the image holder 142 onto the transported sheet member P.

As illustrated in FIG. 2, the fixing device 136 is disposed downstream of the transfer roller 148 in a direction of transporting the sheet member P and includes a heat roller 136*a* and a pressure roller 136*b*.

With this configuration, the driving force of a driving member 138 (see FIG. 3) operated under the control of the controller 120 is transmitted to rotate the heat roller 136*a* and the pressure roller 136*b*, and the sheet member P is transported in such a manner as to be sandwiched between the heat roller 136*a* and the pressure roller 136*b*. The toner image transferred onto the sheet member P due to heat and pressure is thereby fixed onto the sheet member P.

Operation Screen 118

The operation screen 118 is what is called a user interface and is a screen for information delivery between a user of the image forming apparatus 110 and the image forming apparatus 110. Specifically, the operation screen 118 is a screen from which the user instructs the image forming apparatus 110 to perform an image forming operation or the like and knows the operating state of the image forming apparatus 110.

Controller 120

Figure 3:
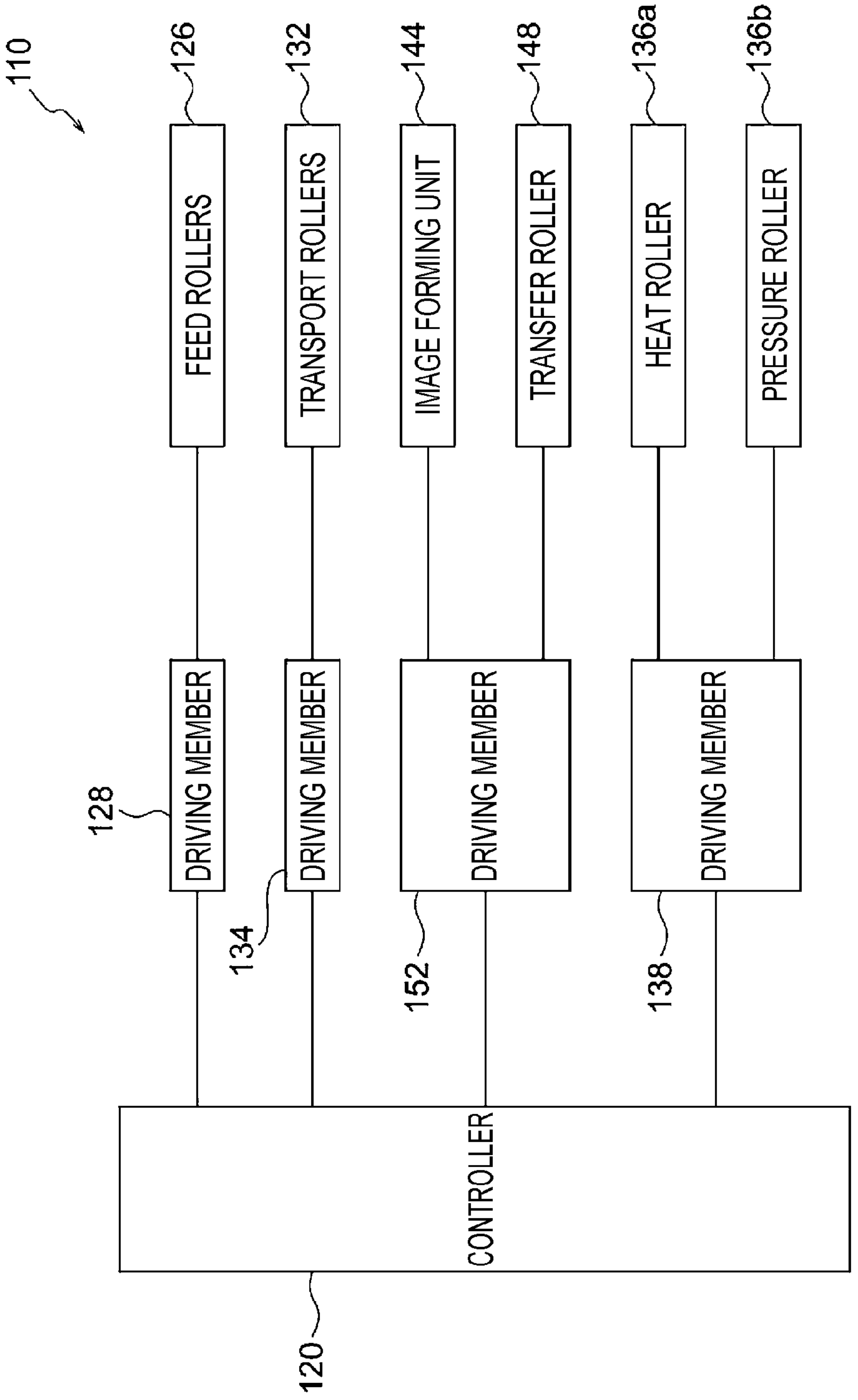
FIG. 3 is a block diagram illustrating a control system of a controller of the image forming apparatus in which the change to the quiet mode is performed by the processing apparatus according to the exemplary embodiment of the present disclosure.

The controller 120 illustrated in FIG. 3 controls the driving members 128, 134, 152, 138, and the like and thereby performs a change to a normal mode or a quiet mode in the image forming apparatus 110.

Specifically, if the normal mode is selected, the controller 120 operates the image forming apparatus 110 in such a manner as to set a normal number of rotations as the numbers of rotations output from the driving members 128, 134, 152, and 138. In contrast, if the quiet mode is selected, the controller 120 operates the image forming apparatus 110 in such a manner as to set a speed lower than that of the normal mode, as the numbers of rotations output from the driving members 128, 134, 152, and 138.

The image forming apparatus 110 thereby produces a lower operating sound in the quiet mode than in the normal mode. However, the number of sheet members P on which an image is formed per unit time in the quiet mode is smaller than that in the normal mode.

Processing Apparatus 10

From a user other than the executing user who executes printing instruction issuance, the processing apparatus 10 illustrated in FIG. 1 receives a change request (a quiet-mode change request) for a change to the quiet mode in the image forming apparatus 110 operating in the normal mode. The processing apparatus 10 then displays the change request on the operation screen 118 of the image forming apparatus 110.

Hardware Configuration of Processing Apparatus 10

Figure 4A:
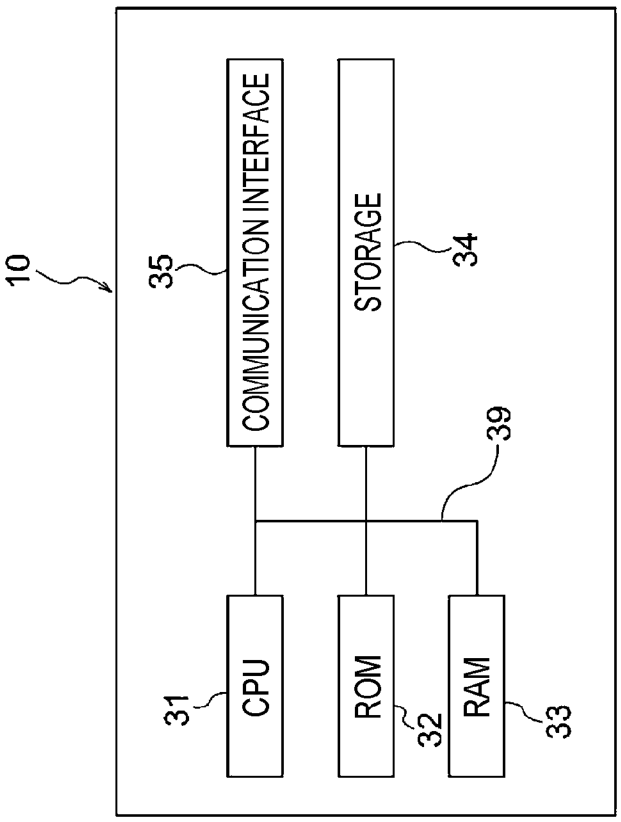
FIGS. 4A and 4B are block diagrams respectively illustrating the hardware configuration and the functional configuration of the processing apparatus of the present disclosure.

As illustrated in FIG. 4A, the processing apparatus 10 has a central processing unit (CPU) 31, a read only memory (ROM) 32, a random access memory (RAM) 33, a storage 34, and a communication interface (I/F) 35. The components are connected to be able to communicate with each other with a bus 39 interposed therebetween.

The CPU 31, for example, runs various programs and controls the components. That is, the CPU 31 reads out a program from the ROM 32 or the storage 34 and runs the program by using the RAM 33 as a work area. The CPU 31 controls the components and various arithmetic processing operations in accordance with a program stored in the ROM 32 or the storage 34. In this exemplary embodiment, for example, if a user (hereinafter, a requesting user) has requested a change to the quiet mode via e-mail or the like, the ROM 32 or the storage 34 stores a processing program for displaying, on the operation screen 118, information indicating that the change to the quiet mode has been requested.

The ROM 32 stores the various programs and various pieces of data. The RAM 33 temporarily stores a program or data, serving as a work area. The storage 34 is composed of a hard disk drive (HDD) or a solid state drive (SSD) and stores the various programs including the operating system and the various pieces of data. The communication interface 35 is an interface for the processing apparatus 10 to communicate with the image forming apparatus 110 or the like, and a standard such as Ethernet (registered trademark), FDDI, or Wi-Fi (registered trademark) is used therefor.

When running the processing program above, the processing apparatus 10 implements various functions by using the hardware resources above. The functional configuration implemented by the processing apparatus 10 will be described.

Functional Configuration of Processing Apparatus 10

Figure 4B:
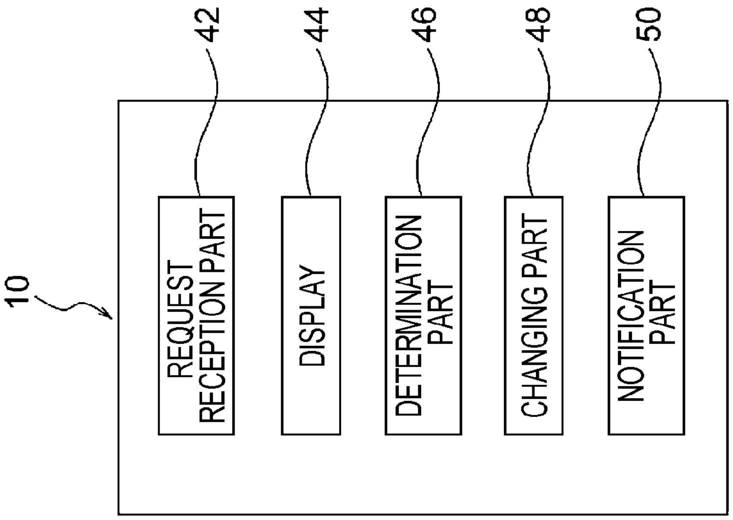

As illustrated in FIG. 4B, the processing apparatus 10 has a request reception part 42, a display 44, a determination part 46, a changing part 48, and a notification part 50. Each component in the functional configuration is implemented in such a manner that the CPU 31 reads out the processing program stored in the ROM 32 or the storage 34 and runs the processing program.

The request reception part 42 receives a quiet-mode change request. The display 44 displays the change request on the operation screen 118 of the image forming apparatus 110. The determination part 46 determines whether the quiet-mode change request is approved or refused.

The changing part 48 performs the change to the quiet mode in the image forming apparatus 110 operating in the normal mode. Specifically, if the executing user having seen the change request displayed on the operation screen 118 inputs a change request approval from the operation screen 118, the determination part 46 determines that the change request is approved. The changing part 48 then performs the change to the quiet mode in the image forming apparatus 110 operating in the normal mode. With the elapse of a predetermined threshold time without the approval and the refusal of the change request after the change request is displayed on the operation screen 118, the changing part 48 performs the change to the quiet mode in the image forming apparatus 110 operating in the normal mode. In other words, if the change request is neither approved nor refused within the threshold time, the changing part 48 performs the change to the quiet mode in the image forming apparatus 110 operating in the normal mode.

The notification part 50 notifies the executing user, via e-mail or the like, that the threshold time has been elapsed and the change to the quiet mode has been performed. In contrast, if the executing user inputs a quiet-mode change request refusal from the operation screen 118, the determination part 46 determines that the change request is refused. The notification part 50 then notifies the requesting user that the quiet-mode change request has been refused, via e-mail or the like.

Actions of Processing Apparatus 10

The actions of the processing apparatus 10 will be described by using the flowchart illustrated in FIG. 5.

If the executing user executes printing instruction issuance in the normal mode, the components of the image forming apparatus 110 are to operate in the normal mode, and thus an image is to be formed on the sheet member P.

Figure 5:
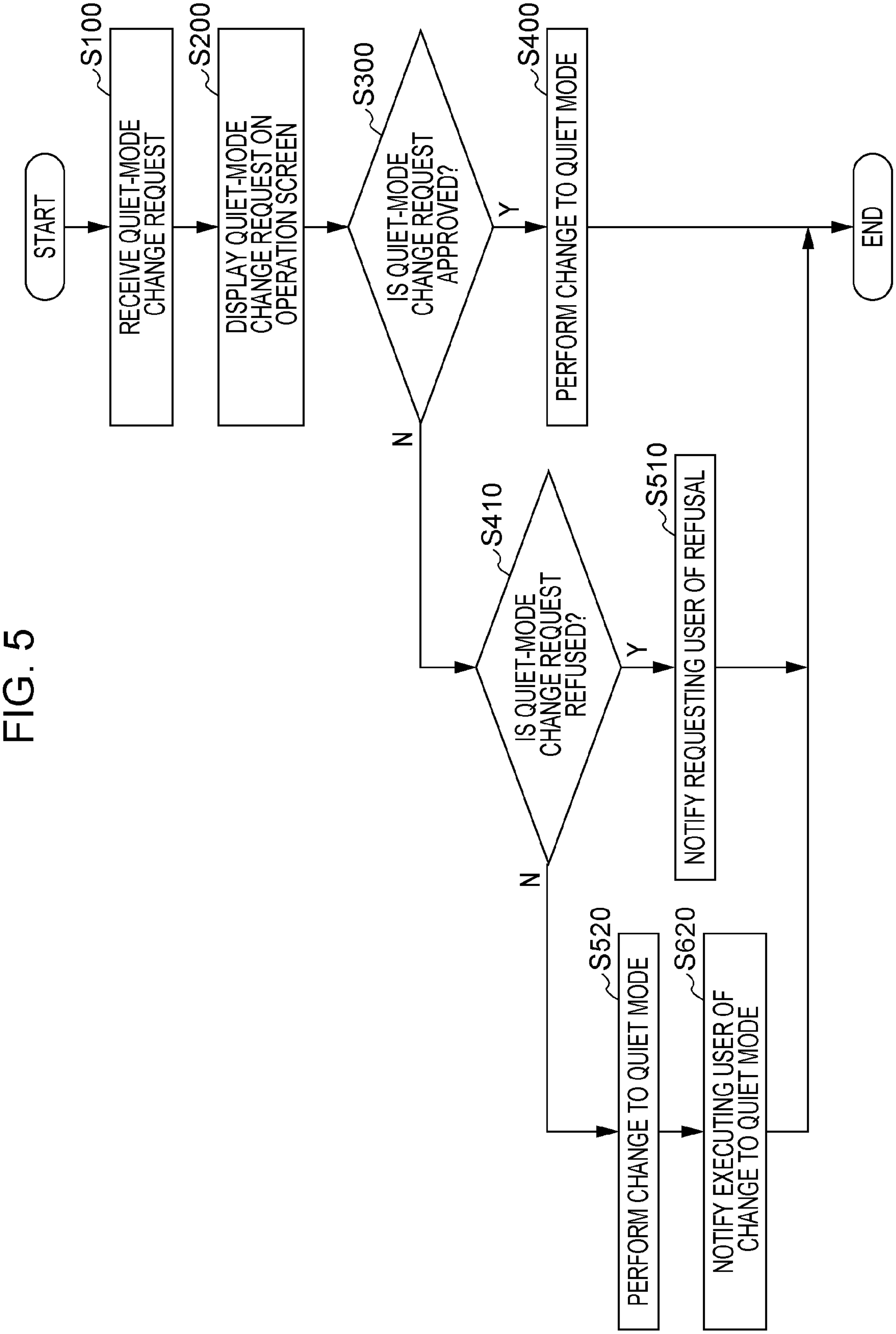
FIG. 5 is a flowchart illustrating control over the image forming apparatus or the like performed by the processing apparatus of the present disclosure.

In step S100 illustrated in FIG. 5, the request reception part 42 receives a quiet-mode change request from a user present near the image forming apparatus 110.

Further, in step S200, the display 44 displays the change request on the operation screen 118 of the image forming apparatus 110.

In step S300, the determination part 46 determines whether the quiet-mode change request is approved. Specifically, the determination part 46 determines whether the executing user inputs a quiet-mode change request approval from the operation screen 118.

If the quiet-mode change request is approved, the processing proceeds to step S400. In step S400, the changing part 48 performs the change to the quiet mode in the image forming apparatus 110 operating in the normal mode. A series of steps are thus terminated. For example, if prompt image formation on the sheet member P is not required, the executing user approves the quiet-mode change request.

In contrast, if the quiet-mode change request is not approved, the processing proceeds to step S410. In step S410, the determination part 46 determines whether the quiet-mode change request is refused. Specifically, the determination part 46 determines whether the executing user inputs a quiet-mode change request refusal from the operation screen 118.

If the quiet-mode change request is refused, operation in the normal mode is continued, and the processing proceeds to step S510. For example, if prompt image formation on the sheet member P is required, the executing user refuses the quiet-mode change request.

In step S510, the notification part 50 notifies the requesting user, via e-mail or the like, that the quiet-mode change request has been refused. The series of steps are thus terminated.

In contrast, if the change request is not refused, and if the predetermined threshold time has elapsed, the processing proceeds to step S520. In other words, if the threshold time has elapsed without the approval and the refusal of the change request, the processing proceeds to step S520. Note that the elapse of the threshold time is based on the elapse of time since the quiet-mode change request is displayed on the operation screen 118 of the image forming apparatus 110.

In step S520, the changing part 48 performs the change to the quiet mode in the image forming apparatus 110 operating in the normal mode. For example, if prompt image formation on the sheet member P is not required, the executing user is distant from the image forming apparatus 110 in some cases. In such cases, the executing user does not look at the operation screen 118 of the image forming apparatus 110, and thus time in which the executing user does not clearly express an approval or a refusal reaches the threshold time.

In step S620, the notification part 50 notifies the executing user that the change to the quiet mode has been performed, via e-mail or the like. The series of steps are thus terminated.

Summarization

As described above, in the processing apparatus 10, the display 44 displays the quiet-mode change request on the operation screen 118 of the image forming apparatus 110. Even a user other than the executing user who executes the printing instruction issuance may thereby express intention of the change to the quiet mode.

If the quiet-mode change request is approved, the changing part 48 in the processing apparatus 10 performs the change to the quiet mode in the image forming apparatus 110. The change to the quiet mode may thereby be performed on the basis of the intention of a requesting user other than the executing user who executes the printing instruction issuance.

If the quiet-mode change request is refused, the notification part 50 in the processing apparatus 10 notifies the requesting user of the refusal. The requesting user thereby knows the refusal intention of the executing user.

If the quiet-mode change request is neither approved nor refused within the threshold time, the changing part 48 in the processing apparatus 10 performs the change to the quiet mode in the image forming apparatus 110. If the executing user does not clearly express an approval or a refusal, the change to the quiet mode is thereby performed in the image forming apparatus 110.

If the change to the quiet mode has been performed in the image forming apparatus 110 because the executing user does not clearly express an approval or a refusal, the notification part 50 in the processing apparatus 10 notifies the executing user that the change to the quiet mode has been performed. The executing user thereby knows that the change to the quiet mode has been performed.

A specific exemplary embodiment of the present disclosure has been described in detail; however, the present disclosure is not limited to the exemplary embodiment, and it is apparent for those skilled in the art that the present disclosure may have various other exemplary embodiments within the scope of the present disclosure. Although description is not particularly provided in the exemplary embodiment above, for example, the changing part 48 may perform the change during the nighttime hours to execute all of printing instructions in the quiet mode. Complaints or the like about noise at night are thereby reduced.

Although description is not particularly provided in the exemplary embodiment above, information regarding the requesting user may also be displayed on the operation screen 118 on which the quiet-mode change request is displayed. For example, if the change to the quiet mode is not allowed, this enables the executing user to explain the reason directly to the requesting user.

Although description is not particularly provided in the exemplary embodiment above, if a printing instruction is executed in the quiet mode from the beginning, the notification part may notify a requesting user having requested a change to the quiet mode that the quiet mode has already been made active, via e-mail or the like.

Although description is not particularly provided in the exemplary embodiment above, if multiple users request a change to the quiet mode for one printing instruction, processing for the first change request is completed, and then processing for a next change request is started.

The image forming apparatus 110 has been taken as an example of an apparatus that forms an image in the description for the exemplary embodiment above; however, the apparatus that forms an image may be a multi-function printer, a single-function printer, an image forming apparatus using an inkjet system, or further an apparatus that forms an image such as a fax machine.

Although description is not particularly provided in the exemplary embodiment above, the processing apparatus 10 may be included in the image forming apparatus 110.

The multiple driving members have been described in the exemplary embodiment above; one driving member may cause multiple devices to operate, and two or more driving members may cause the multiple devices to operate.

The processing executed in such a manner that the CPU 31 reads software (a program) in the exemplary embodiments above may be executed by any of various processors other than a CPU. In this case, examples of the processor include: a programmable logic device (PLD), such as a field-programmable gate array (FPGA), capable of changing the circuit configuration after being manufactured; and a dedicated electric circuit, such as an application specific integrated circuit (ASIC), serving as a processor having a circuit configuration dedicatedly designed to execute specific processing. In addition, the mode changing process may be executed by one of these various processors or by combination of two or more processors of the same type or a different types (such as combination of multiple FPGAs or combination of a CPU and a FPGA). Further, more specifically, the processors have a hardware structure of an electric circuit obtained by combining circuit elements such as semiconductor devices.

The program is stored (installed) in advance in the ROM 32 or the storage 34 in the description for the exemplary embodiments above; however, the present disclosure is not limited to this. The program may be provided in such a manner as to be stored in the recording medium such as a compact disk read only memory (CD-ROM), a digital versatile disk read only memory (DVD-ROM), or a universal serial bus (USB) memory. The program may be downloaded from an external apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A processing apparatus comprising:

a processor configured to:

receive a change request for a change to a quiet mode in an image forming apparatus that is operating in a normal mode and to which a printing instruction has been issued; and display the change request for the change to the quiet mode on an operation screen of the image forming apparatus.

(((2)))

In the processing apparatus according to (((1))), the processor is configured to: receive any of an approval and a refusal of the change request from the operation screen; and in response to the approval of the change request, perform the change to the quiet mode in the image forming apparatus.

(((3)))

In the processing apparatus according to (((2))), the processor is configured to:

in response to the refusal of the change request, notify a user who has made the change request of the refusal.

(((4)))

In the processing apparatus according to any one of (((1))) to (((3))), the processor is configured to:

with elapse of a predetermined time without the approval and the refusal of the change request since the change request is displayed on the operation screen, perform the change to the quiet mode in the image forming apparatus.

(((5)))

In the processing apparatus according to (((4))), the processor is configured to:

in response to the change to the quiet mode, notify a user who has executed issuance of the printing instruction that the change to the quiet mode has been performed.

(((6)))

A program causes a computer to execute a process for processing, the process including: receiving a change request for a change to a quiet mode in an image forming apparatus that is operating in a normal mode and to which a printing instruction has been issued; and displaying the change request for the change to the quiet mode on an operation screen of the image forming apparatus.

What is claimed is:

1. A processing apparatus comprising:

a processor configured to:

receive, from a first user, a change request for a change to a quiet mode in an image forming apparatus that is operating in a normal mode and to which a printing instruction has been issued;

display the change request for the change to the quiet mode on an operation screen of the image forming apparatus, receive any of an approval and a refusal of the change request from the operation screen, from a second user distinct from the first user;

in response to the approval of the change request, perform the change to the quiet mode in the image forming apparatus; and in response to receiving, from the first user, the change request to change to the quiet mode while the image forming apparatus is already operating in the quiet mode, notify the first user that the image forming apparatus is already in the quiet mode, wherein after the change to the quiet mode, the first user is less affected by noise from the image forming apparatus.

2. The processing apparatus according to claim 1, wherein the processor is configured to:

in response to the refusal of the change request, notify the first user who has made the change request of the refusal.

3. The processing apparatus according to claim 1, wherein the processor is configured to:

with elapse of a predetermined time without the approval or the refusal of the change request since the change request is displayed on the operation screen, perform the change to the quiet mode in the image forming apparatus.

4. The processing apparatus according to claim 3, wherein the processor is configured to:

in response to the change to the quiet mode, notify the second user, who has executed issuance of the printing instruction, that the change to the quiet mode has been performed.

5. A non-transitory computer readable medium storing a program causing a computer to execute a process for processing, the process comprising:

receiving, from a first user, a change request for a change to a quiet mode in an image forming apparatus that is operating in a normal mode and to which a printing instruction has been issued;

displaying the change request for the change to the quiet mode on an operation screen of the image forming apparatus;

receiving any of an approval and a refusal of the change request from the operation screen, from a second user distinct from the first user;

in response to the approval of the change request, performing the change to the quiet mode in the image forming apparatus; and in response to receiving, from the first user, the change request to change to the quiet mode while the image forming apparatus is already operating in the quiet mode, notifying the first user that the image forming apparatus is already in the quiet mode, wherein after the change to the quiet mode, the first user is less affected by noise from the image forming apparatus.

6. A processing method comprising:

receiving, from a first user, a change request for a change to a quiet mode in an image forming apparatus that is operating in a normal mode and to which a printing instruction has been issued;

displaying the change request for the change to the quiet mode on an operation screen of the image forming apparatus;

receiving any of an approval and a refusal of the change request from the operation screen, from a second user distinct from the first user;

in response to the approval of the change request, performing the change to the quiet mode in the image forming apparatus; and in response to receiving, from the first user, the change request to change to the quiet mode while the image forming apparatus is already operating in the quiet mode, notifying the first user that the image forming apparatus is already in the quiet mode, wherein after the change to the quiet mode, the first user is less affected by noise from the image forming apparatus.

7. The method according to claim 6, wherein the first user making the change request is present near the image forming apparatus at a distance whereby noise from the image forming apparatus is audible.

* * * * *